United States Patent Office 3,519,358
Patented July 7, 1970

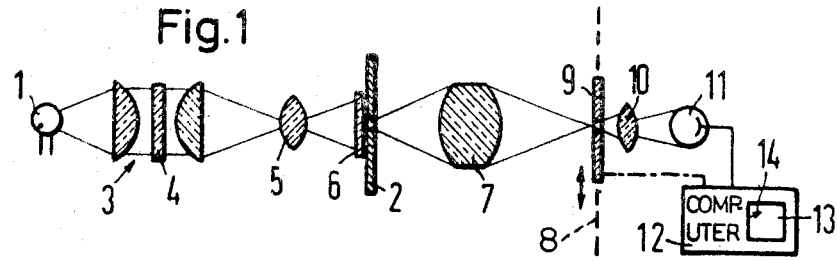
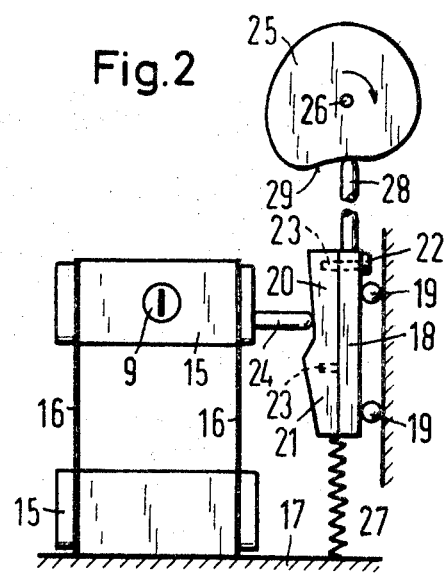
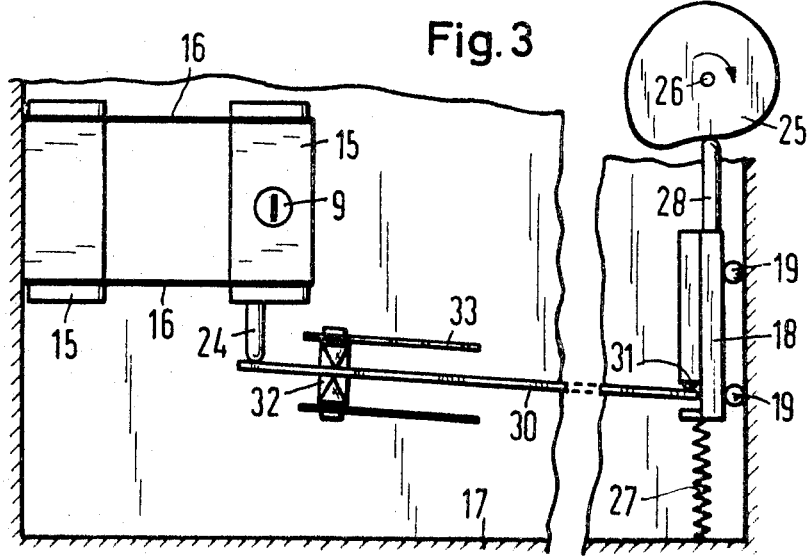

3,519,358
APPARATUS FOR MEASURING OPTICAL TRANSFER FUNCTION
Paul Kuttner, Munich, and Lutz-Volker Zetzmann, Wessling, Germany, assignors to Optische Werke G. Rodenstock, Munich, Germany
Filed July 3, 1968, Ser. No. 742,353
Claims priority, application Germany, July 6, 1967, 1,572,778
Int. Cl. F16h 21/44, 25/08; G01b 9/00
U.S. Cl. 356—124                                                       7 Claims

ABSTRACT OF THE DISCLOSURE

In an apparatus for measuring the transfer function of an objective lens system which produces an image of an illuminated slot, a scanning slot is moved in the image plane of the tested system on a resilient parallelogram linkage and is reciprocated by a cam or a lever connecting the linkage to a slide which is moved back and forth by a radial cam in such a manner that the forward movement is uniform and slower than the return movement. The amplitude of the slide is reduced by the motion transmitting cam or lever for the scanning slot. The light passing the scanning slot is analyzed for the transfer function of the tested objective system.

BACKGROUND OF THE INVENTION

This invention relates to apparatus for measuring the transfer function of optical systems, particularly of photographic and like objective lens systems.

In known devices for determining the optical transfer function, a test image is projected through the objective to be tested, preferably on a reduced scale, and the light distribution in the projected image is determined. Its deviation from the light distribution in test image provides criteria of the image deterioration by distortion, diffraction, manufacturing defects, and the like.

This invention is more specifically concerned with improvements in apparatus of the general type described in which a diffusely illuminated test slit is reproduced by the tested optical system. If the tested lens is well corrected at full aperture, particularly when its correction approaches ideal conditions so that the residual geometrical aberrations are approximately equal to the diffraction error, it is necessary to measure the light distribution in the slit image in a series of spots spaced from each other not significantly more than 0.001 millimeter.

This requires a scanning slit whose width cannot exceed this dimension and a mechanism capable of moving the scanning slit in the image plane of the tested objective system through the projected split image. The operating elements of the mechanical actuating mechanism must be made extremely precisely because they must operate in unison with the calculating and recording devices for evaluating the scanned values.

It was attempted heretofore to avoid the requirement for extreme precision by the use of a well corrected microscopic objective which enlarges the slit image formed by the tested objective system by a factor of at least ten. The scanning slit was then passed through the enlarged image. This expedient reduces the problems of a mechanical nature very much, but the known arrangement actually measures the combined properties of the tested objective system and of the microscopic objective which is a permanent element of the testing apparatus. As long as the tested objective is much inferior in its optical quality to the microscopic objective, the error introduced is insignificant. The test results are seriously distorted if the known apparatus is used for testing objective systems which are geometrically corrected practically to the limit set by diffraction.

An object of the instant invention is the provision of a testing apparatus of the afore-described general type which can accurately determine the optical transfer function of objective lens systems and similar optical systems which closely approach perfect optical quality.

SUMMARY OF THE INVENTION

According to the present invention, the enlarging objective of the known apparatus is omitted, and a scanning slit is bodily moved through the image of the testing slot produced by the tested objective system.

More specifically, the scanning slit is mounted on the movable member of a parallelogram linkage opposite a fixed member of a linkage, the movable member being movable back and forth parallel to the image plane of the tested optical system. A slide is reciprocated at a predetermined amplitude and maintains a constant speed during one stroke of its reciprocating movement, and a substantially higher speed during the other stroke. A motion transmitting train is interposed between the slide and the linkage for moving the movable linkage member back and forth in unison with the slide at a much smaller amplitude. Yieldably resilient means hold the motion transmitting train in continuous engagement with the slide and the linkage without lost motion.

The last mentioned resilient means may be constituted by a spring member which is an element of the parallelogram linkage and connects the fixed linkage member to the movable member which carries the scanning slit. The motion transmitting train may include a wedge-shaped cam and a cam follower which are respectively attached to the slide and to a member of the parallelogram linkage, preferably the afore-mentioned movable member.

If the cam is releasably attached to the slide it may be replaced by another cam having a different oblique angle between its planar cam face engaging the cam follower and the direction of reciprocating movement of the slide.

The cam may be replaced by a lever having two arms of unequal length and respectively engaged by the slide and the linkage. The ratio at which the amplitude of the slide is reduced to that of the scanning slit may be varied by shifting the pivot of the lever.

Additional features, further objects, and many of the attendant advantages of this invention will readily be appreciated as the same becomes better understood by reference to the following detailed description of a preferred embodiment when considered in connection with the appended drawing.

BRIEF DESCRIPTION OF THE DRAWING

FIG. 1 shows the optical and electrical parts of an apparatus of the invention in a conventional manner;
FIG. 2 shows mechanical elements of the apparatus of FIG. 1 in side elevation; and
FIG. 3 shows a modification of the device of FIG. 2.

DESCRIPTION OF THE PREFERRED EMBODIMENT

Referring initially to FIG. 1, there is seen a quartz iodine lamp 1 whose light beam is concentrated on a fixed test slit 2 by a condenser 3 including a heat filter 4 and by a field lens 5 through a diffusing disk 6. An image of the diffusely illuminated test slit is formed by the tested objective 7 in an image plane 8 in which a scanning slit 9 is moved at right angles to the axis of the light beam. Another field lens 10 is interposed between the scanning slit 9 and a photomultiplier tube 11 whose output is fed to a computer 12 equipped with a recorder 13 for evaluating the output signal of the tube 11 and producing indicia of the optical transfer function. The computer is mechanically linked with the scanning slit 9 for moving a stylus 14 in the recorder 13 as will presently be described, other details of the computer 12 and the associated recorder 13 not being directly relevant to this invention since they may be entirely conventional.

This invention is more specifically concerned with actuating mechanism for moving the scanning slit 9 in the image plane of the tested objective 7, such a mechanism being shown in FIG. 2.

The slit 9 is mounted in the upper one of two horizontal bars 15 which are connected at their ends by upright leaf springs 16, the lower bar 15 being attached to the fixed supporting structure or frame 17 of the apparatus. A slide 18 is vertically guided on the frame 17 by ball bearings 19 only partly shown in the drawing. Two integrally connected wedge-shaped cams 20, 21 are attached to the slide 18 by a threaded fastener 22 engaging a tapped hole 23 in the cam 20. A cam follower pin 24 horizontally projects from the upper bar 15 and engages the obliquely inclined cam face of the cam 20 under the pressure of the springs 16.

A radial cam 25 is mounted above the slide 18 on a drive shaft 26 which is rotated at a precisely constant speed by a non-illustrated electric motor. The drive shaft also traverses the stylus 14 of the recorder 13 in a conventional manner, not further illustrated, and thus provides the afore-mentioned mechanical linkage between the computer 12 and the mechanical elements shown in FIG. 2. The speed of the shaft is not critical in itself and may be 12 r.p.m.

The slide 18 rests on a compression spring 27 which balances the weight of the slide as far as this weight is not transmitted to the springs 16 by the cam 20 and the pin 24. Another cam follower pin 28 extends vertically upward from the slide 18 and is held in engagement with the face of the cam 25 by the spring 27 with some assistance from the springs 16.

Approximately eighty percent of the cam face on the cam 25 extend in an Archimedes spiral about the axis of the shaft 26, and the remaining cam face portion 29 radially and circumferentially connects the two ends of the spiral in an arcuate path which is free from abrupt changes in direction.

The cam 21 is also equipped with a tapped bore 23 which may be engaged by the fastener 22 in a position to hold the cam 21 in engagement with the pin 24. The angle defined by the cam face of the cam 20 with the vertical direction of movement of the slide 18 is smaller than the corresponding angle of the cam 21. The amplitude of horizontal movement of the slit 9 is thus increased when the pin 24 is engaged with the cam 21.

The scanning slit 9 has a width of 0.001 mm. and is readily prepared by known photographic, mechanical or chemical methods. It is reciprocated horizontally by the shaft 26 with an amplitude of only a few tenths of a millimeter while it remains always parallel to the image of the test split because of the parallelogram linkage formed by the springs 16 and the bars 15. Its movements are precisely coordinated with the traverse movement of the stylus 14 on the recorder 13.

The pins 24, 28 are held in abutting engagement with the associated cams 20 or 21 and 25 by the springs 16, 27, and the apparatus is free from oscillations which would be superimposed on the desired movement of the slit 9 or the recorder 13 and would produce spurious signals.

The slit 9 is moved across the image of the test slit at uniform velocity, and is quickly returned after its traverse. The slope of the cam portion 29 on the radial cam 25 is chosen as steep as is possible without causing significant elastic deformation of the slide 18 and of other elements of the motion transmitting train during the reversal of movement.

The radial cam 25 has a diameter of 40 millimeters in an actual embodiment of the invention which has been operated very successfully. A cam of this size is readily made with the necessary precision. Any effects which deviations of the cam face from the true shape of an Archimedes spiral may have on the motion of the slit 9 are reduced in magnitude by the wedge shaped cams 20 or 21 whose planar faces are readily machined with high precision. The entire motion transmitting train operates without lost motion.

The ratio between the amplitude of the slit 9 and the length of the stylus traverse in the recorder 13 remains the same for any scale of magnification produced by the tested optical system. The computer 12 which performs a Fourier analysis of the output from the photomultiplier tube 11 thus need not be adjusted electrically or otherwise for different tested optical systems. Such a simple mode of operation is not available in the known devices in which the test slit is moved during the measuring operation, and the coordination between slit movement and computer setting must be changed with changing magnification factor.

We have found it convenient and adequate to provide a set of cams for the slide 18 which provide slit amplitudes of 0.1, 0.2, 0.4, 0.8, and 1.6 mm. The corresponding frequency correction in the computer by powers of two is accomplished in a very simple manner. Two or more of the cams may be combined into a unitary body in the manner shown in the drawing with reference to cams 20, 21 to facilitate the changeover.

FIG. 3 shows partial modification of the apparatus of FIG. 2 in which the reciprocating movement of the slide 18 is transmitted with reduced amplitude to a slit 9 by means of a lever 30 having two arms of unequal length. The parallelogram linkage of the two springs 16 and the two bars 15 is mounted on a vertical member of the frame 17 in such a manner that the movable bar 15 swings vertically. Its pin 24 engages the shorter arm of the lever 30. The cams 20, 21 are replaced on the otherwise unchanged slide 18 by a rounded abutment 31 which engages the longer arm of the lever 30.

The ratio at which the amplitude of the slide 18 is reduced to that of the slit 9 can be varied by shifting the pivot assembly 32 of the lever 30 along the lever and along rails 33 on the frame 17, thereby changing the length ratio of the lever arms. Regardless of the position of the pivot 32 the amplitude of the slide 18 remains the same. It travels at uniform speed during one stroke of its reciprocating movement, and moves at a higher speed during its return stroke to impart similarly related movements to the scanning slit 9.

What is claimed is:

1. In an apparatus for measuring the transfer function of an optical system including two slits, a light source for illuminating one of said slits, a support for holding an optical system to be tested in a position in which an image of said one slit is formed by said optical system in the plane of the other slit, actuating means for moving the slits relative to each other, and means for evaluating the light passed by said other slit during the relative movement of the slits, the improvement in the actuating means which comprises:

(a) mounting means including a parallelogram linkage having one fixed member and a member opposite to the fixed member and movable back and forth parallel to said plane, said other slit being mounted on said opposite member;

(b) a slide member;

(c) reciprocating means for reciprocating said slide member at a predetermined amplitude, said reciprocating means moving said slide member at a constant speed during one stroke of the reciprocating movement thereof, and at a speed substantially higher than said constant speed during the return stroke of said reciprocating movement;

(d) motion transmitting means interposed between said slide member and said linkage for moving said movable member back and forth in unison with said slide member at an amplitude substantially smaller than said predetermined amplitude; and (e) yieldably resilient means holding said motion transmitting means in continuous engagement with said slide member and said linkage without lost motion.

2. In an apparatus as set forth in claim 1, said yieldably resilient means including a spring member constituting an element of said linkage connecting said fixed member and said movable member.

3. In an apparatus as set forth in claim 2, said motion transmitting means including a wedge-shaped cam member and a cam follower member and attaching means respectively attaching said members of the motion transmitting means to said slide member and to a member of said linkage.

4. In an apparatus as set forth in claim 3, said last mentioned member of said linkage being said movable member.

5. In an apparatus as set forth in claim 3, said attaching means releasably attaching said cam member to said slide member for replacement of the cam member by another wedge-shaped cam member, each of said cam members when fastened to said slide member having a planar cam face engaging said cam follower member under the holding force of said yieldably resilient means, said cam face being inclined at an oblique angle to the direction of reciprocating movement of said slide member, said angles being different in said cam members.

6. In an apparatus as set forth in claim 2, said motion transmitting means including a lever member having two arms of unequal length and engaging means on said slide member and said linkage respectively engaging said arms.

7. In an apparatus as set forth in claim 6, means for varying the ratio of the lengths of said arms.

References Cited

UNITED STATES PATENTS

| | | |
|---|---|---|
| 2,604,004 | 7/1952 | Root. |
| 3,193,690 | 7/1965 | Murata et al. |
| 3,438,271 | 4/1969 | Cain. |

RONALD L. WIBERT, Primary Examiner

T. MAJOR, Assistant Examiner

U.S. Cl. X.R.

74—55, 99